US012490866B2

(12) United States Patent
Knight, Sr.

(10) Patent No.: US 12,490,866 B2
(45) Date of Patent: Dec. 9, 2025

(54) UTENSIL HOLDING DEVICE

(71) Applicant: Bernard Knight, Sr., Sanford, FL (US)

(72) Inventor: Bernard Knight, Sr., Sanford, FL (US)

(*) Notice: Subject to any disclaimer, the term of this patent is extended or adjusted under 35 U.S.C. 154(b) by 0 days.

(21) Appl. No.: 18/496,842

(22) Filed: Oct. 28, 2023

(65) Prior Publication Data

US 2024/0148195 A1 May 9, 2024

Related U.S. Application Data

(60) Provisional application No. 63/422,960, filed on Nov. 5, 2022.

(51) Int. Cl.
*A47J 47/16* (2006.01)

(52) U.S. Cl.
CPC ..................... *A47J 47/16* (2013.01)

(58) Field of Classification Search
CPC .... A47J 47/16; A47F 5/06; A47F 5/04; A47F 5/05
USPC .............. 211/70.7, 196, 205; 248/37.3, 37.6
See application file for complete search history.

(56) References Cited

U.S. PATENT DOCUMENTS

| | | | | |
|---|---|---|---|---|
| 1,807,500 A * | 5/1931 | Hazael | ................. | A47B 23/007 248/413 |
| 2,086,980 A * | 7/1937 | Kirby | ................. | H04M 1/04 379/454 |
| D248,402 S * | 7/1978 | Kittell | ................. | D19/86 |
| 4,320,700 A * | 3/1982 | Stachowicz | ......... | A47J 37/0786 126/30 |
| 5,037,049 A * | 8/1991 | Funk | ................. | A47F 5/01 248/167 |
| D320,332 S * | 10/1991 | Fetty | ................. | D7/638 |
| 5,396,993 A * | 3/1995 | Spitler | ................. | A47J 47/16 248/37.3 |
| D361,472 S * | 8/1995 | Heilicher | ................. | D7/505 |
| D367,153 S * | 2/1996 | Sturm | ................. | D6/674 |
| 5,826,843 A * | 10/1998 | Sturm | ................. | A47F 7/0071 248/176.1 |
| 5,873,195 A * | 2/1999 | Wortham | ............... | A47G 7/042 211/207 |
| D408,229 S * | 4/1999 | Hong | ................. | D7/638 |
| D419,034 S * | 1/2000 | Sturm | ................. | D7/628 |
| 6,346,051 B1 * | 2/2002 | Otsubo | ................. | A63B 57/60 248/688 |
| 6,505,746 B1 * | 1/2003 | Johnson | ................. | A47J 47/16 248/37.3 |
| D513,154 S * | 12/2005 | Goodman | ................. | D7/601 |
| 7,311,289 B2 * | 12/2007 | Mori | ................. | G09F 1/10 248/165 |
| D631,697 S * | 2/2011 | Kushner | ................. | D7/505 |

(Continued)

*Primary Examiner* — Jennifer E. Novosad

(57) ABSTRACT

A Serving Utensil Holder made of materials approved for food service. The holder has a flat base. The base is connected to stationary or adjustable shaft with top end fitted with a utensil holder attachment to hold various types, and sizes of food serving utensils. Serving utensil holder flat base includes a vertical flange around the top perimeter for catching and keeping food droppings and liquids from hanging serving utensils and keeping the drippings on top of the base surface preventing them from spilling onto buffet, tables, or counter-tops. Attachments can be permanently made on shaft, or fixed with fasteners allowing other attachments to be used on the same utensil holder.

1 Claim, 5 Drawing Sheets

(56) References Cited

U.S. PATENT DOCUMENTS

| | | | | |
|---|---|---|---|---|
| 8,215,681 | B2* | 7/2012 | Stevenson | D03D 29/00 |
| | | | | 289/16.5 |
| 8,833,704 | B1* | 9/2014 | Neighbors | A47J 36/34 |
| | | | | 248/37.3 |
| 9,526,378 | B2* | 12/2016 | Heron | A47J 47/16 |
| 9,756,985 | B2* | 9/2017 | Knight, Sr. | A47J 47/16 |
| D890,577 | S* | 7/2020 | Cotter | D7/637 |
| 10,791,828 | B1* | 10/2020 | Ryan | A47B 43/00 |
| 10,806,276 | B1* | 10/2020 | Chargois | A47B 75/00 |
| D941,641 | S* | 1/2022 | Zheng | D7/637 |
| 11,253,092 | B1* | 2/2022 | Wilson | F16M 11/041 |
| 11,969,121 | B2* | 4/2024 | Weeks | A47B 77/14 |
| D1,033,962 | S* | 7/2024 | McGarry | D6/526 |
| 2003/0205645 | A1* | 11/2003 | Kaposi | A47G 21/14 |
| | | | | 248/37.3 |
| 2004/0124323 | A1* | 7/2004 | Kamenstein | A47F 5/0006 |
| | | | | 248/176.1 |
| 2008/0290054 | A1* | 11/2008 | Cass | A47J 47/16 |
| | | | | 211/70 |
| 2013/0168342 | A1* | 7/2013 | Yatscoff | A47F 5/04 |
| | | | | 211/85.2 |
| 2015/0014495 | A1* | 1/2015 | Bausman | A47J 47/16 |
| | | | | 248/176.2 |
| 2015/0305497 | A1* | 10/2015 | Dolan | A47F 7/17 |
| | | | | 211/70.7 |
| 2016/0106266 | A1* | 4/2016 | Heron | A47J 45/00 |
| | | | | 220/574 |
| 2021/0338014 | A1* | 11/2021 | Russell | A47J 47/16 |
| 2024/0148195 | A1* | 5/2024 | Knight, Sr. | A47J 47/16 |

* cited by examiner

UTENSIL HOLDING DEVICE

FIELD OF THE INVENTION

The present invention relates to cooking and food serving utensils and, more particularly, a stand having a flat base that holds spoons, ladles, tongs, and other various cooking and food serving utensils when not in use to keep them from contamination from being left on counters, stove tops or in serving pans with the food.

BACKGROUND OF THE INVENTION

Spoons, ladles, tongs, and other serving utensils used in the commercial food service and home kitchens are either left in the food pan or on counters which in both cases increase the chances of the utensil being contaminated and thus contaminating the food. Some in the food service industry have made attempts to elevate this problem by creating serving spoon rests, which are small bowls or trays that hold the serving utensil keeping them from being left in cooking containers, on stoves, on food servers, counter-tops or tables when the utensil is not being used.

There are various designs of spoon holders or spoon rests available on the market, such as those shaped like bowls that cradles spoons and other food serving utensils when they are not in use. There are also spoon holders on stands enabling the serving utensils to freely hang when they are not in use.

These products may work in some home and commercial settings, but some utensil holders and spoon rests take up space and are often in the way. There are some utensil holders and spoon rests that don't easily allow serving utensils to be placed and removed from them when needed. Because of a poor design, some utensil holders allow food or food dropping from the food serving utensils to fall on the stove, counter-tops or tables.

It is therefore an object of the invention to provide a holder for food serving utensils that doesn't require a lot of space. It is another object of the invention to keep food serving utensils from contamination through being left on counter-tops, tables, stoves or other surfaces. It is another object of the invention to provide a holding place for food serving utensils that allows food serving spoons and other utensils to be easily placed and removed when needed. It is another object of the invention to provide a food serving utensils holder that has an area that prevents food and food droppings from the serving utensils from falling on counter-tops, tables, stoves, and other surfaces.

SUMMARY OF INVENTION

In accordance with the present invention, there is provided a Serving Utensil Holder made of stainless steel or any material, metal, plastic, or composite that is approved to be used in the food service industry. The serving utensil holder has a flat base connected to a vertical tubular shaft having a telescoping L-shaped arm that adjust up and down. The L-shaped arm has a connection point at the end to receive removable attachments for hanging various serving utensils. Serving utensil holder base includes a flat portion and vertical flange for keeping food and food droppings from falling from the serving utensils onto stoves, counters, or tables.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
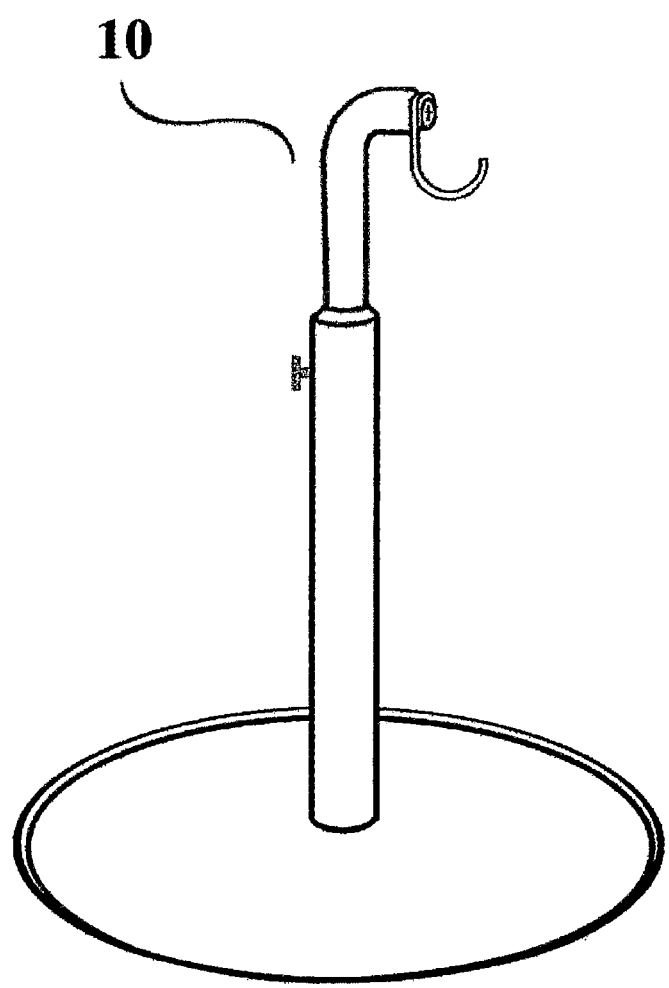
FIG. 1 is a right perspective view of a serving utensil holder with a flat base in accordance with the invention.

FIG. 1 is a right view of a Serving Utensil Holder 10 in accordance with the invention.

Figure 2:
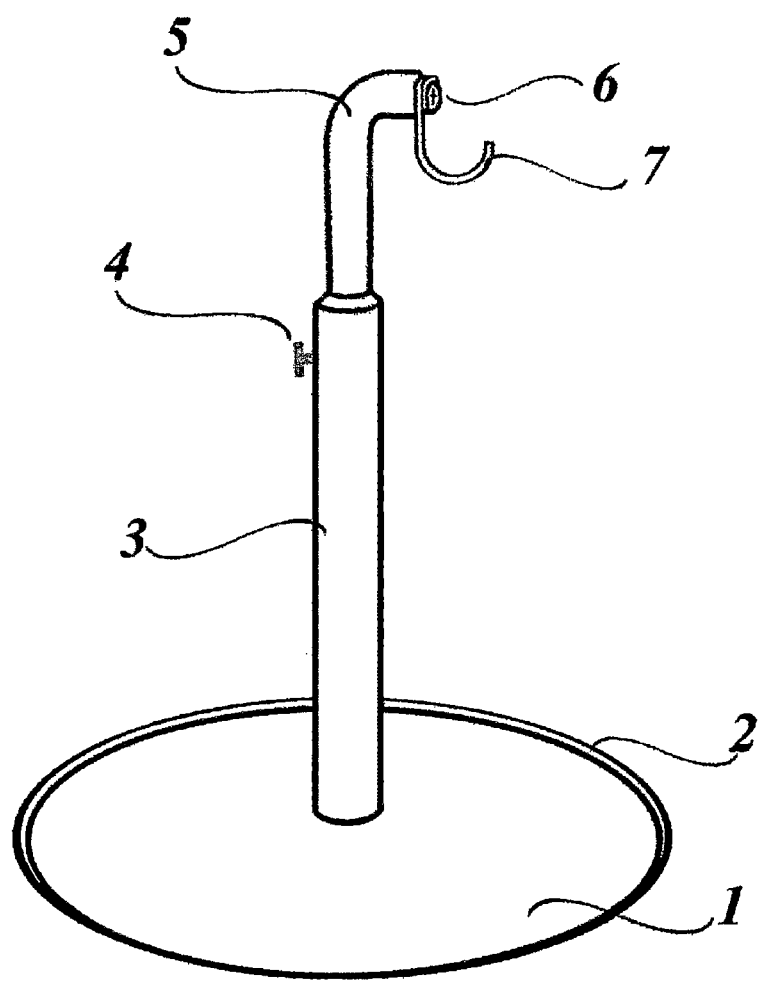
FIG. 2 is a right perspective view of a serving utensil holder with a flat base having a vertical flange edge that keeps food and food droppings from falling from the serving utensils onto stoves, counters, or tables. The flat base is connected to a vertical tubular shaft that has a telescoping L-shaped arm. The adjustable arm has a connection point to receive a hook-shaped utensil attachment for holding food serving utensils in accordance with the invention.

FIG. 2 is a right view of a Serving Utensil Holder 10 in accordance with the invention, showing a flat base 1 having a vertical flange edge 2, for keeping food particles or droppings from the serving utensils on the flat base 1 base of the serving utensil holder 10 and preventing them from spilling onto tables, counter-tops, stoves, and other surfaces. Flat base 1 connects to a vertical tubular shaft 3, telescoping L-shaped arm 5 with thumb screw 4, for adjusting telescoping L-shaped arm 5. A hook-shaped attachment 7, is secured to the telescoping L-shaped arm 5 by a fastener 6.

Figure 3:
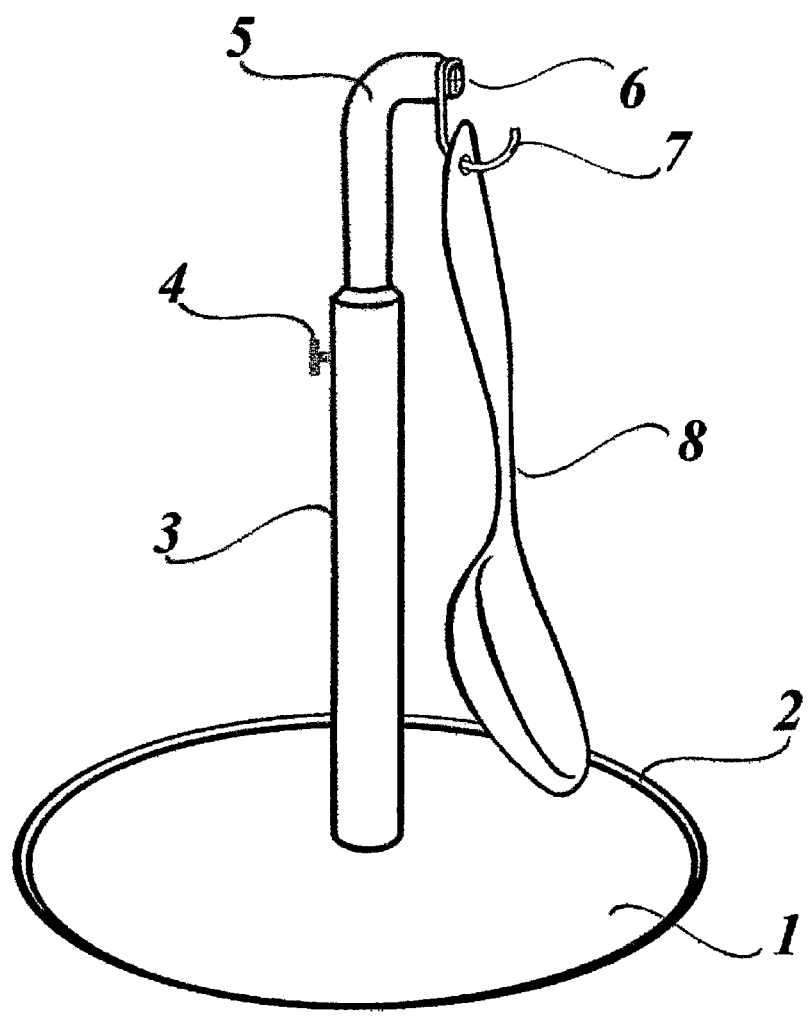
FIG. 3 is a right perspective view of a serving utensil holder with a flat base having a vertical flange edge that keeps food and food droppings from falling from the serving utensils onto stoves, counters, or tables. The base is connected to a vertical tubular shaft that has a telescoping L-shaped arm. The adjustable arm has a connection point to receive a hook-shaped attachment for holding food serving utensils in accordance with the invention.

FIG. 3 is a right view of a Serving Utensil Holder 10 in accordance with the invention, showing a flat base 1 having a vertical flange edge 2, for keeping food particles or droppings from the serving utensils on the flat base 1 of the serving utensil holder 10 and preventing them from spilling onto tables, counter-tops, stoves, and other surfaces. Flat base 1 connects to a vertical tubular shaft 3, telescoping L-shaped arm 5 with thumb screw 4, for adjusting telescoping L-shaped arm 5. A hook-shaped attachment 7, is secured to the telescoping L-shaped arm 5 by a fastener 6. The hook shaped attachment 7 is holding a spoon 9.

Figure 4:
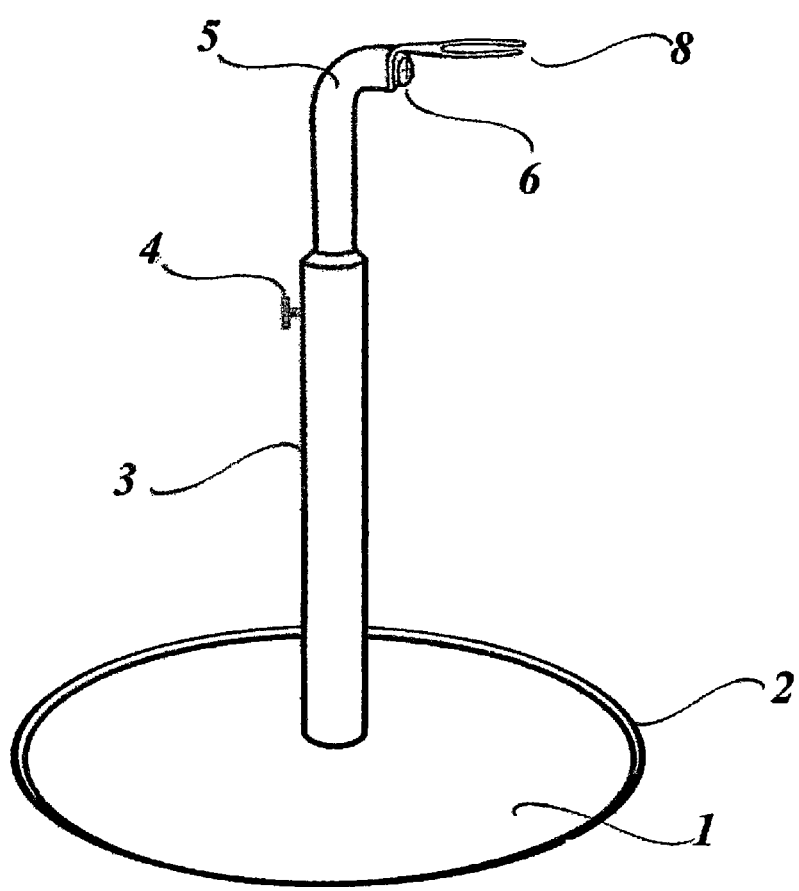
FIG. 4 is a right perspective view of a serving utensil holder with a flat base having a vertical flange edge that keeps food and food droppings from falling from the serving utensils onto stoves, counters, or tables. The base is connected to a vertical tubular shaft that has a telescoping L-shaped arm. The adjustable arm has a connection point to receive a C-shaped prong attachment that is holding a spoon food serving utensil in accordance with the invention.

FIG. 4 is a right view of a Serving Utensil Holder 10 in accordance with the invention, showing a flat base 1 having a vertical flange edge 2, for keeping food particles or droppings from the serving utensils on the flat base 1 of the serving utensil holder 10 and preventing them from spilling onto tables, counter-tops, stoves, and other surfaces. Flat base 1 connects to a vertical tubular shaft 3, telescoping L-shaped arm 5 with thumb screw 4, for adjusting telescoping L-shaped arm 5. A C-shaped attachment 8, is secured to the telescoping L-shaped arm 5 by a fastener 6.

Figure 5:
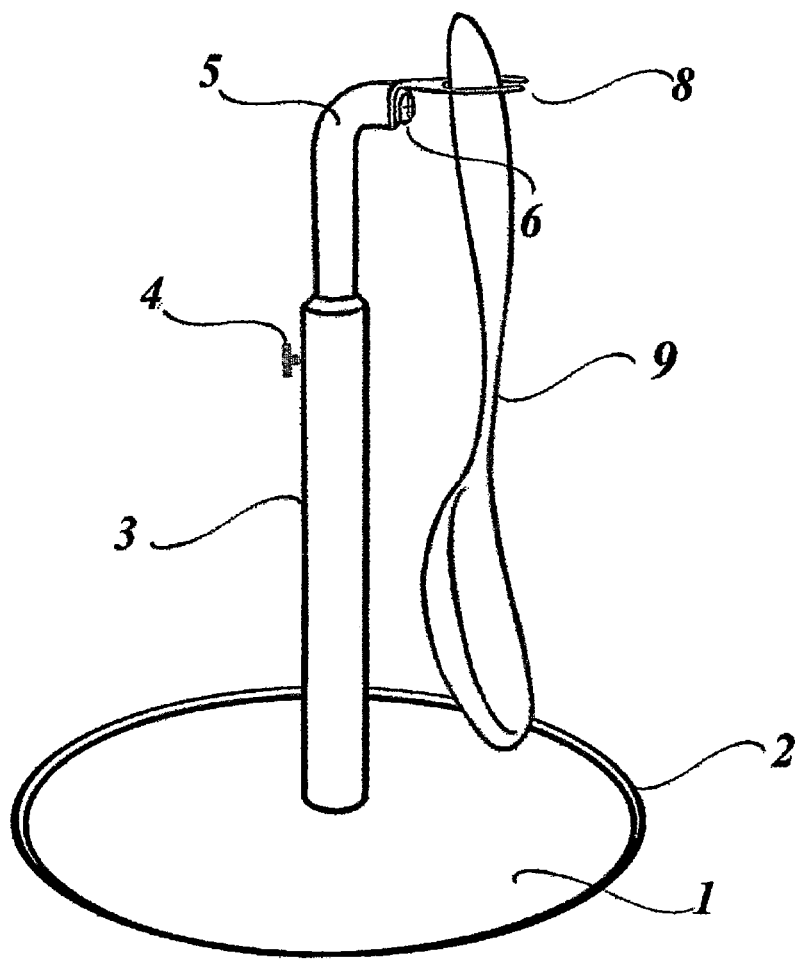
FIG. 5 is a right view of a serving utensil holder with a flat base having a vertical flange edge that keeps food and food droppings from falling from the serving utensils onto stoves, counters, or tables. The base is connected to a vertical tubular shaft that has a telescoping L-shaped arm. The adjustable arm has a connection point to receive a C-shaped attachment for holding serving utensils in accordance with the invention.

FIG. 5 is a right view of a Serving Utensil Holder 10 in accordance with the invention, showing a flat base 1 having a vertical flange edge 2, for keeping food particles or droppings from the serving utensils on the flat base 1 base of the serving utensil holder 10 and preventing them from spilling onto tables, counter-tops, stoves, and other surfaces. Flat base 1 connects to a vertical tubular shaft 3, telescoping L-shaped arm 5 with thumb screw 4, for adjusting telescoping L-shaped arm 5. A C-shaped attachment 8, is secured to the telescoping L-shaped arm 5 by a fastener 6. The C-shaped attachment 8 is holding a spoon 9.

What is claimed:

1. A serving utensil holder for hanging cooking and food serving utensils, the holder consisting essentially of:
    a substantially circular shaped flat base, including an upper surface and a lower surface for resting on a substantially horizontally extending surface, the base having a vertical flange extending upwardly from a peripheral and circumferential edge,
    a support including a vertical tubular shaft having an upper end and a lower end connected to a center region of the substantially circular shaped base, an L-shaped arm having an outside end and an inside end telescopically connected to the upper end of the vertical tubular support,
    a hanging attachment detachably connected to the outside end of the L-shaped arm by a fastener, wherein the hanging attachment is a generally J-shaped vertically extending hook or a generally C-shaped horizontally extending hook and is adapted to hang the serving utensils therefrom,
    a thumb screw allowing adjustment of the L-shaped arm with respect to the vertical tubular shaft to accommodate varying heights of the serving utensils hanging from the holder such that a lower surface of the serving utensil is adapted to be located above the upper surface of the base, wherein the base having an area on the upper surface that is adapted to catch food and food droppings and preventing liquids from falling onto the on counter-tops, tables, stoves or other surfaces.

\* \* \* \* \*